United States Patent
Yang

(10) Patent No.: US 9,338,418 B2
(45) Date of Patent: May 10, 2016

(54) PROJECTION SYSTEM, PROJECTOR, AND CALIBRATION METHOD THEREOF

(71) Applicant: DELTA ELECTRONICS, INC., Taoyuan Hsien (TW)

(72) Inventor: Chung-Yi Yang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 161 days.

(21) Appl. No.: 13/912,796

(22) Filed: Jun. 7, 2013

(65) Prior Publication Data

US 2014/0285532 A1    Sep. 25, 2014

(30) Foreign Application Priority Data

Mar. 22, 2013    (TW) .................................. 102110147

(51) Int. Cl.
*G09G 5/10* (2006.01)
*H04N 9/31* (2006.01)

(52) U.S. Cl.
CPC .......... *H04N 9/3194* (2013.01); *H04N 9/3182* (2013.01); *G09G 2320/0626* (2013.01); *G09G 2320/0693* (2013.01); *G09G 2340/045* (2013.01); *G09G 2360/144* (2013.01)

(58) Field of Classification Search
CPC .............. G09G 2320/0693; G09G 2320/0626; G09G 2320/0606; G09G 5/10; H04N 9/3194; H04N 9/3182
See application file for complete search history.

(56) References Cited

U.S. PATENT DOCUMENTS

| | | | | |
|---|---|---|---|---|
| 2007/0055143 | A1* | 3/2007 | Deroo et al. | 600/425 |
| 2007/0067124 | A1* | 3/2007 | Kimpe et al. | 702/67 |
| 2009/0115915 | A1* | 5/2009 | Steinberg et al. | 348/745 |
| 2013/0187958 | A1* | 7/2013 | Kimpe et al. | 345/690 |

* cited by examiner

*Primary Examiner* — William Boddie
*Assistant Examiner* — Bryan Earles
(74) *Attorney, Agent, or Firm* — Hauptman Ham, LLP

(57) ABSTRACT

A projection system includes a projector, an uncalibrated DDL output unit, a light detection device, a characteristic curve computation unit, a calibration unit and a calibrated DDL output unit. The uncalibrated DDL output unit is used for driving the projector to project a frame to an area of a projected object. The light detection device is used for detecting brightness values of the area. The characteristic curve computation unit is used for obtaining a characteristic curve based on the uncalibrated DDLs and the detected brightness values. The calibration unit is used for executing a calibration process according to the characteristic curve and GSDF, so as to map each of the uncalibrated DDLs to a calibrated DDL. The calibrated DDL output unit is used for driving the projector to project another frame to the area of the projected object.

12 Claims, 10 Drawing Sheets

PROJECTION SYSTEM, PROJECTOR, AND CALIBRATION METHOD THEREOF

RELATED APPLICATIONS

This application claims priority to Taiwan Application Serial Number 102110147, filed Mar. 22, 2013, which is herein incorporated by reference.

BACKGROUND

1. Technical Field

Embodiments of the present invention relate to a projector. More particularly, embodiments of the present invention relate to a projection system, a projector and a calibration method thereof.

2. Description of Related Art

Because the medical display is essential in diagnosis, it is highly required to show all details of diagnosing images to prevent the medical professionals from any incorrect conclusions.

To assure all the displays for use in the medical apparatus able to precisely show all the necessary details, Digital Imaging and Communications in Medicine (DICOM) is thereby developed. In the DICOM, Grayscale Standard Display Function (GSDF) is a standardized display function for grayscale images to regulate the requirements of images for use in medicine, such as the standard of luminosity.

In this regard, any display for the medical apparatus, such as LCD, CRT and so on, needs to meet the GSDF requirement. However, it is a challenge to make a projector capable of projecting images that meet the GSDF requirement.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A projection system, a projector and a calibration method thereof for projecting images meeting requirements of Grayscale Standard Display Function (GSDF) are provided.

In accordance with one embodiment of the present invention, a projection system includes a projector, an uncalibrated Digital Driving Level (DDL) output unit, a light detection device, a characteristic curve computation unit, a calibration unit and a calibrated DDL output unit. The uncalibrated DDL output unit is used for driving the projector at different uncalibrated DDLs to respectively project a frame to an area of a projected object. The light detection device is used for detecting brightness values of the area when the projector is driven at different uncalibrated DDLs. The characteristic curve computation unit is used for obtaining a characteristic curve based on the uncalibrated DDLs and the detected brightness values. The calibration unit is used for executing a calibration process according to the characteristic curve and GSDF, so as to map each of the uncalibrated DDLs to a calibrated DDL. The calibrated DDL output unit is used for driving the projector at one of the calibrated DDLs to project another frame to the area of the projected object.

In accordance with another embodiment of the present invention, a projector includes an image projection module, an uncalibrated DDL output unit, a characteristic curve computation unit, a calibration unit and a calibrated DDL output unit. The uncalibrated DDL output unit is used for driving the projector at different uncalibrated DDLs to respectively project a frame to an area of a projected object. The characteristic curve computation unit is used for obtaining a characteristic curve based on the uncalibrated DDLs and brightness values detected by a brightness detection device. The calibration unit is used for executing a calibration process according to the characteristic curve and GSDF, so as to map each of the uncalibrated DDLs to a calibrated DDL. The calibrated DDL output unit is used for driving the image projection module at one of the calibrated DDLs to project another frame to the area of the projected object.

In accordance with yet another embodiment of the present invention, a method for calibration a projector includes the steps of: projecting frames to an area of a projected object by a projector driven at different uncalibrated DDLs; detecting brightness values of the area by a brightness detection device when the projector is driven at the different uncalibrated DDLs, so as to obtain a characteristic curve; executing a calibration process according to the characteristic curve and GSDF, so as to map each of the uncalibrated DDLs to a calibrated DDL; and projecting another frame to the area of the projected object by the projector driven at one of the calibrated DDL.

In the foregoing embodiments, the brightness values not only relate to the projected frames, but also relate to the ambient light. Therefore, the DDLs of the projector can be calibrated in consideration of the ambient brightness, such that the DDLs can be calibrated, and the projector can project frames or images that meet the requirements of the GSDF.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
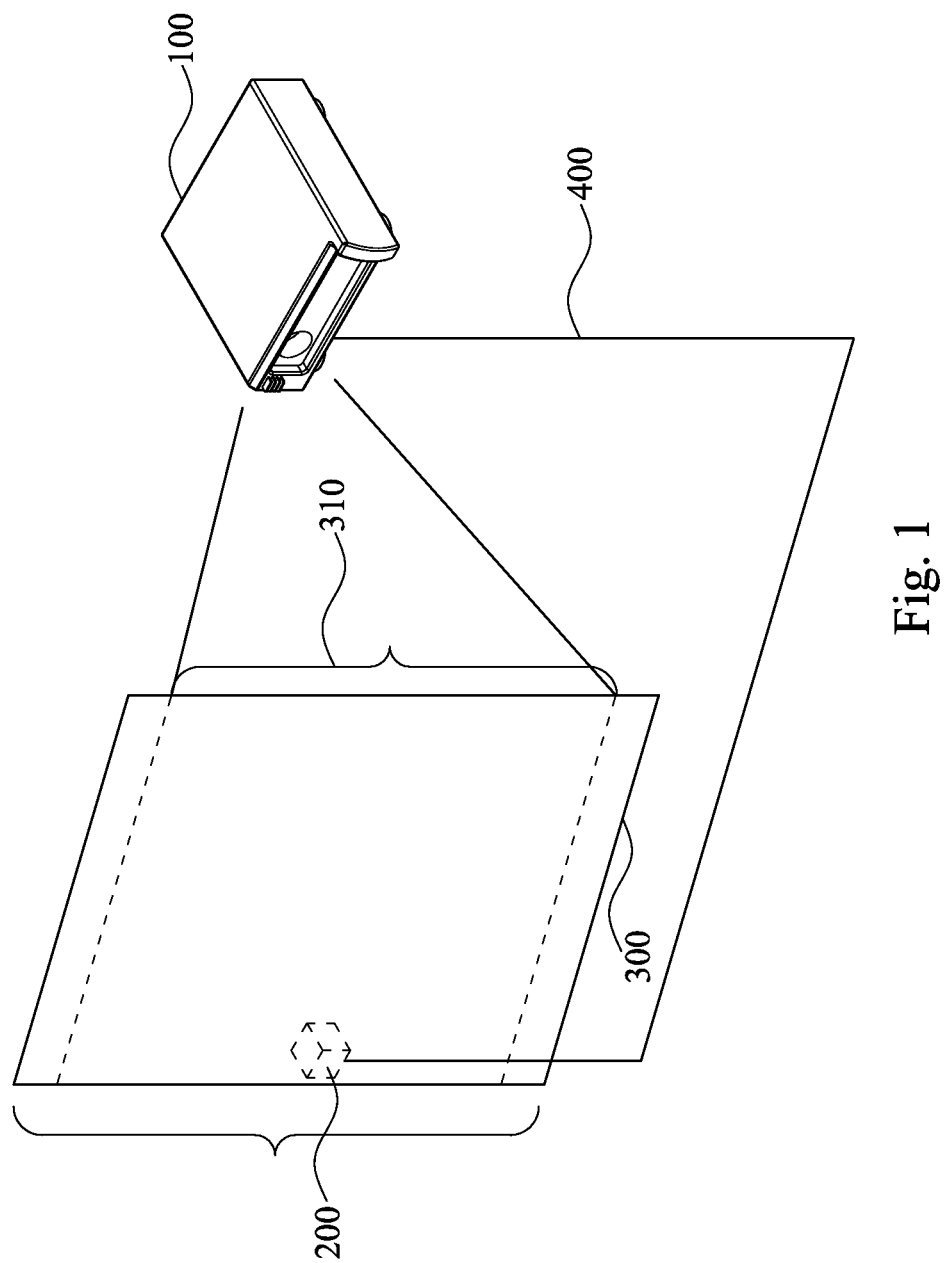
FIG. 1 is a schematic perspective view of the projection system in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic perspective view of the projection system in accordance with one embodiment of the present invention. As shown in FIG. 1, the projection system includes a projector 100. The projector 100 projects a frame to an area 310 of a projected object 300. However, the brightness of the projected frame on the projected object 300 is easy to be influenced by the ambient light. For example, when the projected object 300 is exposed to the sunlight, the brightness is higher; in contrast, when the projected object 300 is positioned in an indoor circumstance, the brightness is lower. Therefore, as long as the ambient brightness varies, the projector 100 is difficult to comply with the GSDF defined by the DICOM. Therefore, the projection system in accordance with embodiments of the present invention provides a brightness detection device 200. The brightness detection device 200 can be electrically connected to the projector 100 in a wire (such as connected by the connecting wire 400) or wireless communication, such that the projector can project the frames or images in consideration of the ambient brightness, so as to comply with the GSDF.

Figure 2:
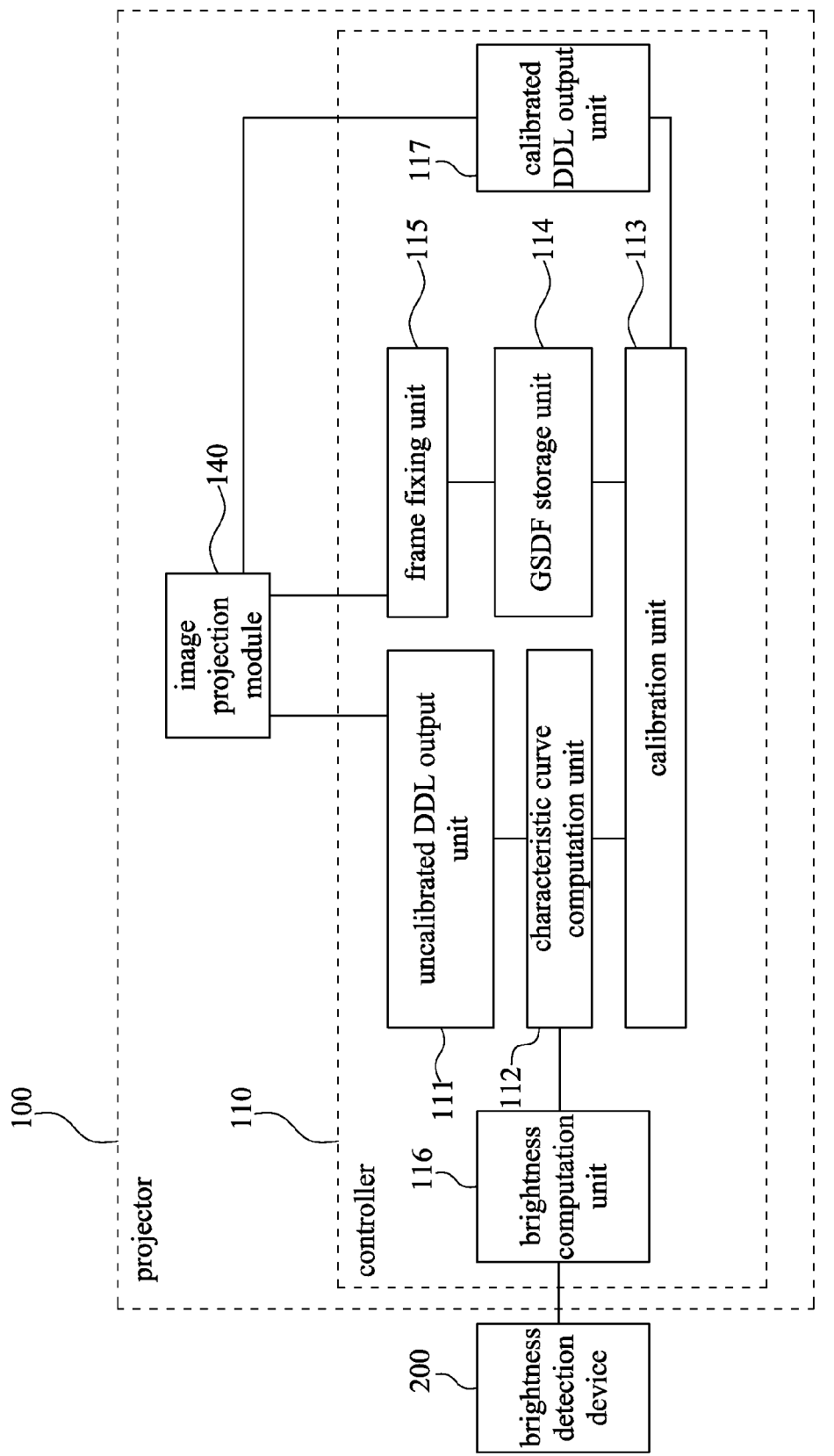
FIG. 2 is a functional block diagram of the projection system in accordance with one embodiment of the present invention.

In particular, referring to FIG. 2, this figure is a functional block diagram of the projection system in accordance with one embodiment of the present invention. As shown in FIG. 2, the projector includes an image projection module 140 and a controller 110 electrically connected to the image projection module 140. The controller 110 includes an uncalibrated DDL output unit 111, a characteristic curve computation unit 112, a calibration unit 113, a GSDF storage unit 114 and a calibrated DDL output unit 117. The uncalibrated DDL output unit 111 of the controller 110 is electrically connected to the image projection module 140 of the projector 100. The uncalibrated DDL output unit 111 can be used for driving the image projection module 140 at different uncalibrated DDLs to respectively project a frame to the area 310 of the projected object 300 (See FIG. 1). The light detection device 200 is used for detecting brightness values of the area 310 when the projector 100 is driven at the different uncalibrated DDLs. The characteristic curve computation unit 112 is electrically connected to the brightness detection device 200, and it can be used for obtaining a characteristic curve based on the uncalibrated DDLs and brightness values detected by a brightness detection device 200. The GSDF storage unit 114 stores the GSDF. The calibration unit 113 is electrically connected to the characteristic curve computation unit 112 and the GSDF storage unit 114, and it can respectively obtain the characteristic curve and the GSDF from the characteristic curve computation unit 112 and the GSDF storage unit 114. The calibration unit 113 can be used for executing a calibration process according to the characteristic curve and the GSDF, so as to map each of the uncalibrated DDLs to a calibrated DDL. The calibrated DDL output unit 117 is electrically connected to the calibration unit 113 and the image projection module 140, so that it obtains the calibrated DDLs from the calibration unit 113, and can be used for driving the image projection module 140 at one of the calibrated DDLs to project a calibrated frame to the area 310 of the projected object 300. Therefore, the projector 100 can project frames or images in consideration of the ambient brightness, so as to comply with the GSDF.

It is understood that the "uncalibrated" DDL in this application refers to the DDL that is not calibrated yet, while the "calibrated" DDL in this application refers to the DDL that has already been calibrated. The DDL is a digital value, which given as input to a display system produces a Luminance, such as an 8-bit digital signal value, namely, $0 \leq DDL \leq 255$, in which the DDL is an integer.

Figure 3:
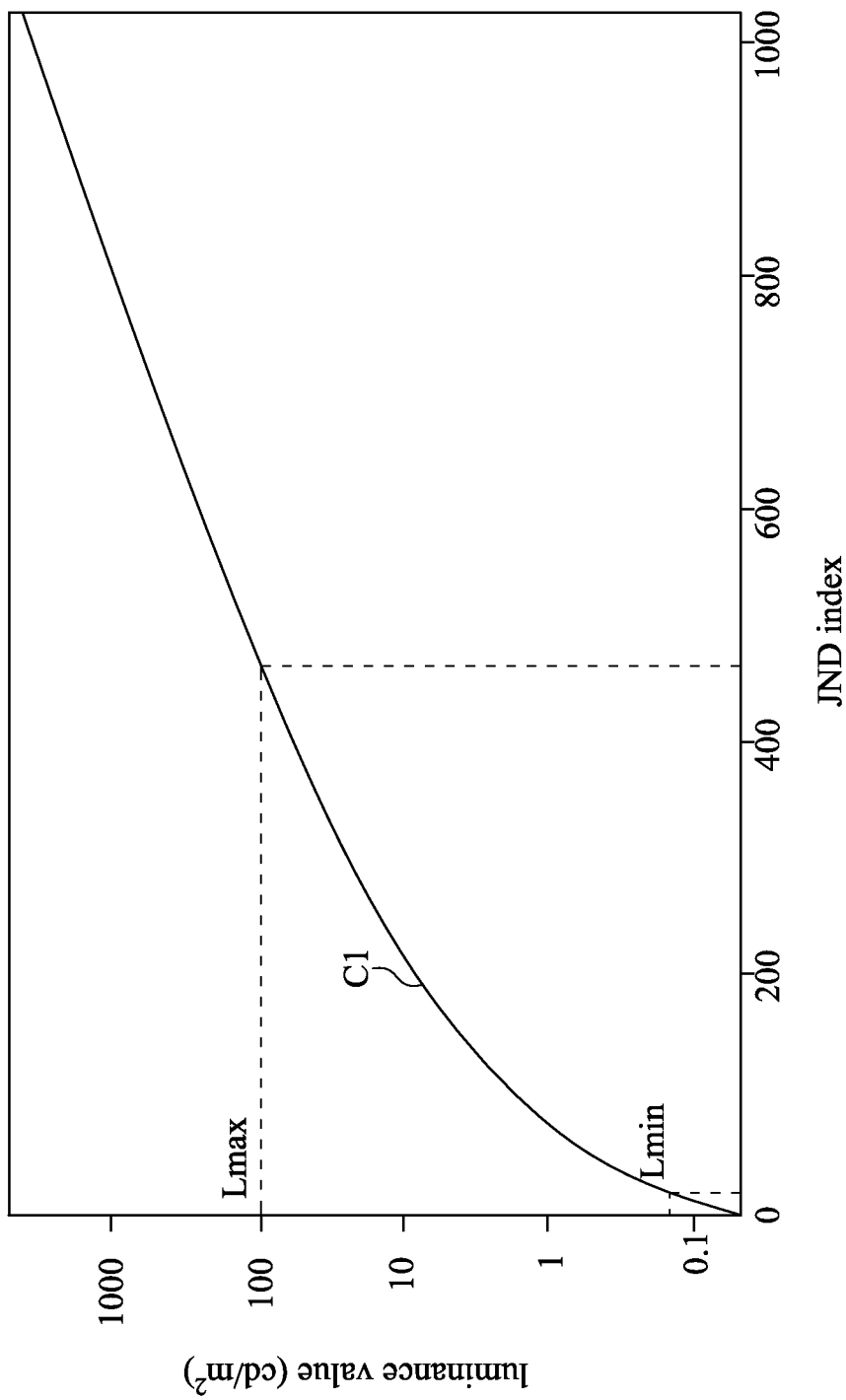
FIG. 3 is a curve diagram presenting the GSDF.

FIG. 3 is a curve diagram presenting the GSDF. The transverse axis refers to the Just-Noticeable Difference index (JND index), and the longitudinal axis refers to the logarithm-brightness value. The brightness value refers to the luminance value ($cd/m^2$) in this diagram. JND refers to the luminance difference of a given target under given viewing conditions that the average human observer can just perceive. JND index refers to the input value to the GSDF, such that one step in JND index results in a luminance difference that is exact a JND. The GSDF is shown as:

$$\log_{10}L(j) = \frac{(a + c \cdot Ln(j) + e \cdot (Ln(j))^2 + g \cdot (Ln(j))^3 + m \cdot (Ln(j))^4)}{1 + b \cdot Ln(j) + d \cdot (Ln(j))^2 + f \cdot (Ln(j))^3 + h \cdot (Ln(j))^4 + k \cdot (Ln(j))^5},$$

in which L(j) is the luminance value, and j is JND index, and $1 \leq j \leq 1023$, and j is an integer;

Ln refers to the natural logarithm;

a=−1.3011877, b=−2.5840191E-2, c=8.0242636E-2, d=−1.0320229E-1, e=1.3646699E-1, f=2.8745620E-2, g=−2.5468404E-2, h=−3.1978977E-3, k=1.2992634 E-4, and m=1.3635334 E-4.

Figure 4:
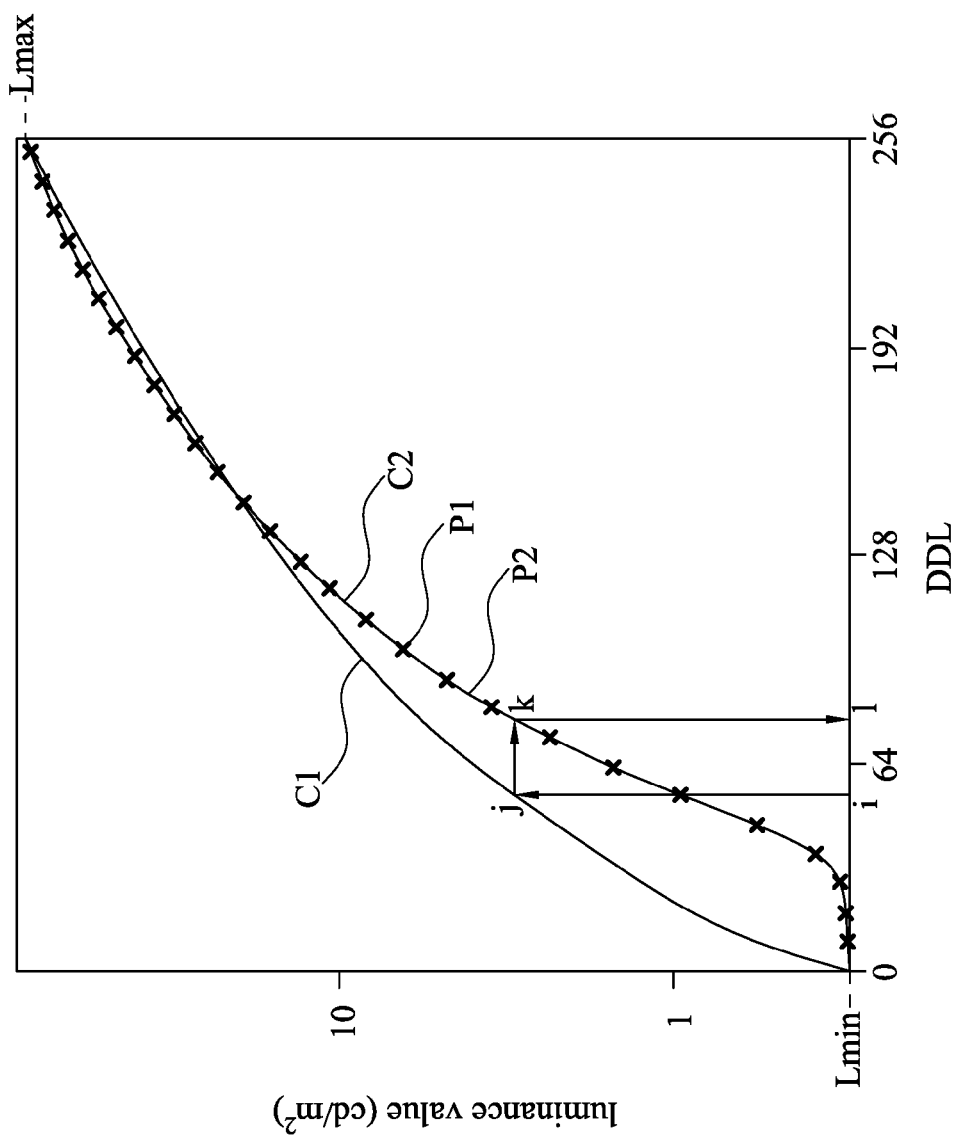
FIG. 4 is a curve diagram presenting a characteristic curve C2 in accordance with one embodiment of the present invention and a curve C1 presenting the GSDF.

FIG. 4 is a curve diagram presenting a characteristic curve C2 in accordance with one embodiment of the present invention and a curve C1 presenting the GSDF in a selected luminance value range between the minimum luminance value Lmin and the maximum luminance value Lmax. The transverse axis refers to the DDL, and the longitudinal axis refers to the brightness value. The brightness value refers to the luminance value herein. The projector 100 driven at different DDLs projects frames with different brightness values. For example, when the DDL is 70, the luminance value detected by the brightness detection device 200 (See FIG. 2) approximates about 2.15 $cd/m^2$; when the DDL is 135, the luminance value detected by the brightness detection device 200 approximates about 15.9 $cd/m^2$. The foregoing values are just for explaining, not for limiting, the present invention.

According to the DDL and the brightness values detected by the brightness detection device 200, the characteristic curve computation unit 112 can produce the characteristic curve C2. For example, referring to FIGS. 2 and 4, the brightness detection device 200 can detect and obtain plural detected data P1, and the characteristic curve computation unit 112 can compute, and thereby obtain computed data P2 according to the detected data P1 by the interpolation method. The characteristic curve computation unit 112 can produce the characteristic curve C2 based on the detected data P1 and the computed data P2.

Referring to FIGS. 2, 3 and 4, the luminance value detected by the brightness detection device 200 ranges from the minimum luminance value Lmin and the maximum luminance value Lmax. The calibration unit 113 retrieves a corresponding segment of the curve C1 presenting the GSDF, in which the segment lies between the minimum luminance value Lmin and the maximum luminance value Lmax.

According to the curve C1 presenting the GSDF and the characteristic curve C2, the calibration unit 113 can calibrate the DDLs. In particular, as shown in FIGS. 2 and 4, the uncalibrated DDL refers to the point "i". The calibration unit 113 can map the point "i" to the curve C1 presenting the GSDF, and thereby obtain the first brightness value, referring to the point "j". The calibration unit 113 can obtain a second brightness value, referring the point "k", on the characteristic curve C2, in which the second brightness value is equal to the first brightness value. In other words, the longitudinal value of the point "k" is equal to the longitudinal value of the point "j". The calibration unit 113 can map the second brightness value, referring the point "k", to the calibrated DDL, referring to the point "l", according to the characteristic curve C2.

Because the calibration unit 113 can map each of the uncalibrated DDLs to a calibrated DDL according to the curve C1 presenting the GSDF and the characteristic curve C2, it can then produce a look-up table (LUT) presenting the uncalibrated DDLs, such as the point "i", versus the calibrated DDLs, such as the point "l". Therefore, when the image projection module 140 (See FIG. 2) receives an uncalibrated DDL, such as the DDL_i, it can obtain the corresponding calibrated DDL, such as the DDL_l, according to the LUT in the calibration unit 113, and then, the calibrated DDL output unit 117 drives the image projection module 140 by the DDL_l, so that the image projection module 140 can project frames or images complying with the GSDF. Further, a LUT recording the video signal DDLs can be alternatively configured in the image projection module 140, and therefore, the foregoing calibrated DDL output unit 117 can also be configured in the image projection module 140.

In addition to the ambient brightness, the brightness of the projected frame is also influenced by the size of the frame. For example, when the frame shrinks, the brightness thereof may increase; in contrast, when the frame expands, the brightness thereof may decrease. Therefore, in some embodiments, as shown in FIG. 2, the projection system alternatively includes a frame fixing unit 115 for fixing the size of the frame projected by the image projection module 140, so as to prevent from influencing the brightness values detected by the brightness detection device 200.

In some embodiments, when the size of the frame varies, the frame fixing unit 115 can control the image projection module 140 to fix the size of the frame after varying. When the size of the frame is fixed, the brightness detection device 200 can re-detect the brightness values, and the characteristic curve computation unit 112 can re-obtain the characteristic curve C2 (See FIG. 4), and the calibration unit 113 can re-execute the calibration process. Therefore, even though the size of the frame varies, the projector 100 can still project the frames or images complying with the GSDF.

In addition to the ambient brightness and the size of the frame, the gain value of the projected object 300 (See FIG. 1) may also influence the brightness value detected by the brightness detection device 200. Therefore, in some embodiments, as shown in FIG. 2, the projection system alternatively includes a brightness computation unit 116. The brightness values detected by the light detection device 200 can be illuminance values (lux). The brightness computation unit 116 can receive the illuminance values, and can compute and thereby obtain the luminance values of the frames according to the illuminance values and the gain value of the area 310 of the projected object 300. In particular, when the illuminance value "l" is detected by the brightness detection device 200, the brightness computation unit 116 may perform the following equation to obtain the luminance value "L":

$$l \times r / \pi = L,$$

in which $\pi$ is the circumference rate, namely, $\pi = 3.1415926 \ldots$;

and r is the reflective index of the projected object 300.

The reflective index "r" of the projected object 300 is approximately equal to the gain thereof, or is in a positive correlation to the gain. Therefore, by the foregoing equation, the luminance value "L" can be obtained according to the gain (or the reflective index) and the illuminance value "l". Therefore, the projector 100 can project frames or images that comply with the GSDF in consideration of the gain value by the computation of the brightness computation unit 116. Preferably, the gain value is 1, and the reflective index is also 1.

Figure 5:
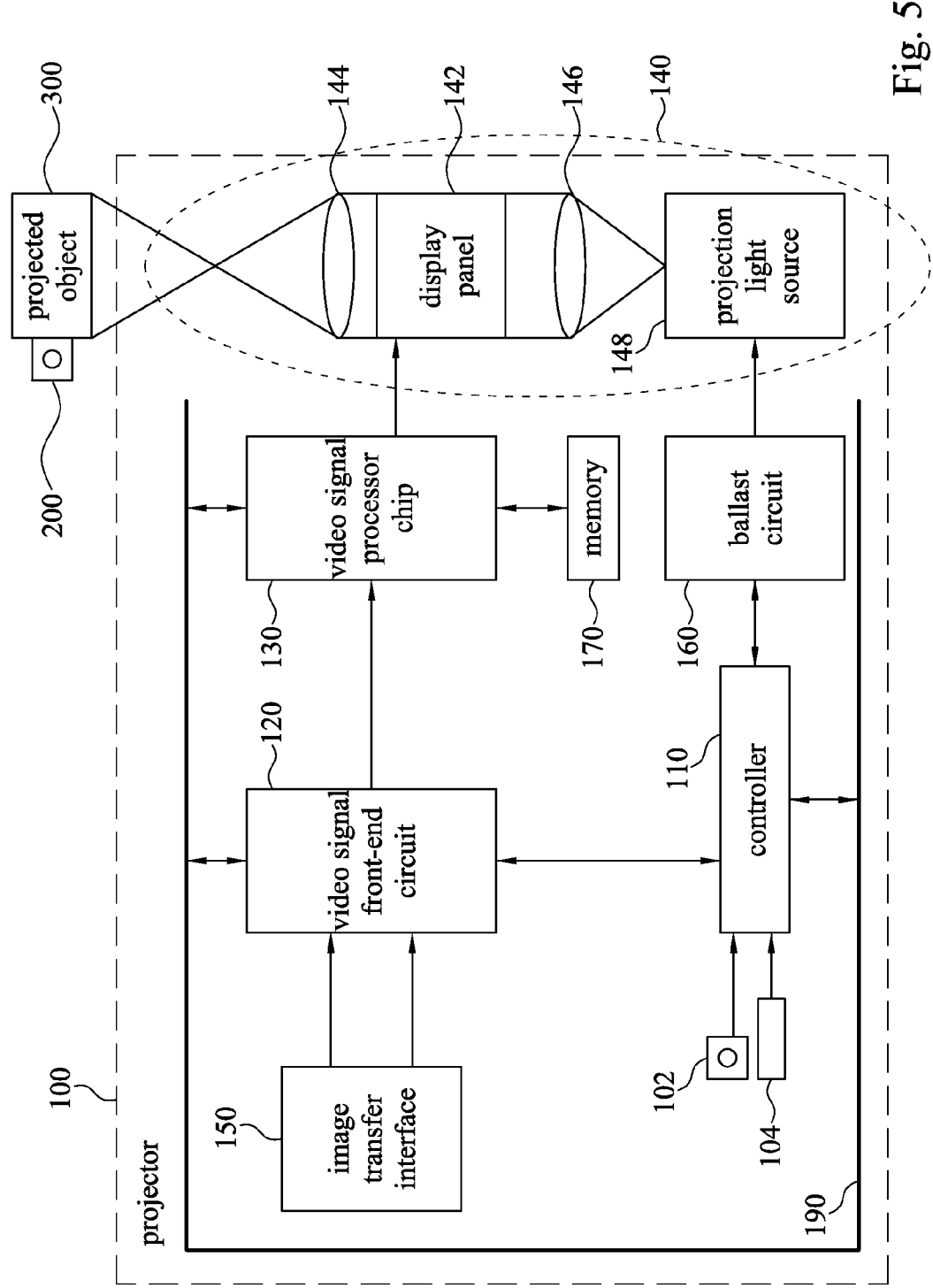
FIG. 5 is a hardware block diagram of the projection system in accordance with one embodiment of the present invention.

FIG. 5 is a hardware block diagram of the projection system in accordance with one embodiment of the present invention. As shown in FIG. 5, the projector 100 includes a controller 110, a video signal front-end circuit 120, a video signal processor chip 130, an image projection module 140, an image transfer interface 150, a ballast circuit 160, a memory 170 and a bus 190. The controller 110, the video signal front-end circuit 120, and the video signal processor chip 130 are all electrically connected to the bus 190. The image projection module 140 is electrically connected to the video signal processor chip 130. Therefore, the controller 110 can control the image projection module 140 to project frames through the video signal front-end circuit 120, and the video signal processor chip 130.

Referring to FIG. 5, in some embodiments, the controller 110 can be controlled by an external device through a remote sensor 102 or through a connection interface 104. The remote sensor 102 can be, but is not limited to be, an IR sensor. The connection interface 104 can be, but is not limited to be, an RS232 interface. Referring to FIGS. 2 and 5, the uncalibrated DDL output unit 111, the characteristic curve computation unit 112, the calibration unit 113, the GSDF storage unit 114, the frame fixing unit 115, the brightness computation unit 116 and the calibrated DDL output unit 117 can be all configured and integrated in the controller 110 of the projector 100. For example, the foregoing units can be, but are not limited to be, the program, the software, or the firmware, installed in the controller 110.

During the calibration process, the controller 110 can control the video signal processor chip 130 to output white frames with different brightness values according to different uncalibrated DDLs for calibration. When the calibration process is completed, the controller 110 can control the video signal processor chip 130 to output frames that comply with the GSDF according to the calibrated DDLs.

In some embodiments, an external device, such as a cell phone, a video signal generator, a notebook and so on, can transmit frames to the video signal front-end circuit 120 through the video transfer interface 150. The video signal front-end circuit 120 can convert the format of frame for adapting to the image projection module 140. For example, the video signal front-end circuit 120 can convert the analog video frame to the digital video frame. During the calibration process, the frame transmitted by the external device to the video signal front-end circuit 120 can be a white frame.

In some embodiments, the video signal processor chip 130 can receive the frames transmitted by the video signal front-end circuit 120, and can adjust the quality of the frame. For example, the video signal processor chip 130 can adjust, but is not limited to adjust, the image resolution, the color saturation and so on. In some embodiments, the memory 170 can be the buffer memory required by the video signal processor chip 130 during processing signals, such as adjusting the refresh rate.

In some embodiments, the video signal processor chip 130 can provide frames by itself without receiving the frames from the video signal front-end circuit 120. For example, the video signal processor chip 130 can generate white images or single-color images with predetermined luminance.

In some embodiments, the image projection module 140 can project the frames from the video signal processor chip 130 to the projected object 300. In particular, the image projection module 140 includes a display panel 142, a rear lens set 144, a front lens set 146 and a projection light source 148. The front lens set 146, the display panel 142 and the rear lens set 144 are sequentially disposed on the optical path of the light emitted by the projection light source 148. The projection light source 148 is electrically connected to the ballast circuit 160. The display panel 142 is electrically connected to the video signal processor chip 130 for receiving the frames transmitted by the video signal processor chip 130. When the ballast circuit 160 is conducted, the projection light source 148 emits lights, and the lights sequentially pass through the front lens set 146, the display panel 142 and the rear lens set 144, so that the frames displayed by the display panel 142 can be projected to the projected object 300.

In some embodiments, the brightness detection device 200 can be, but is not limited to be, a photometer, a light-meter, a photo-sensor and so on. In some embodiments, the projected object 300 can be, but is not limited to be, a screen or a wall.

Figure 6:
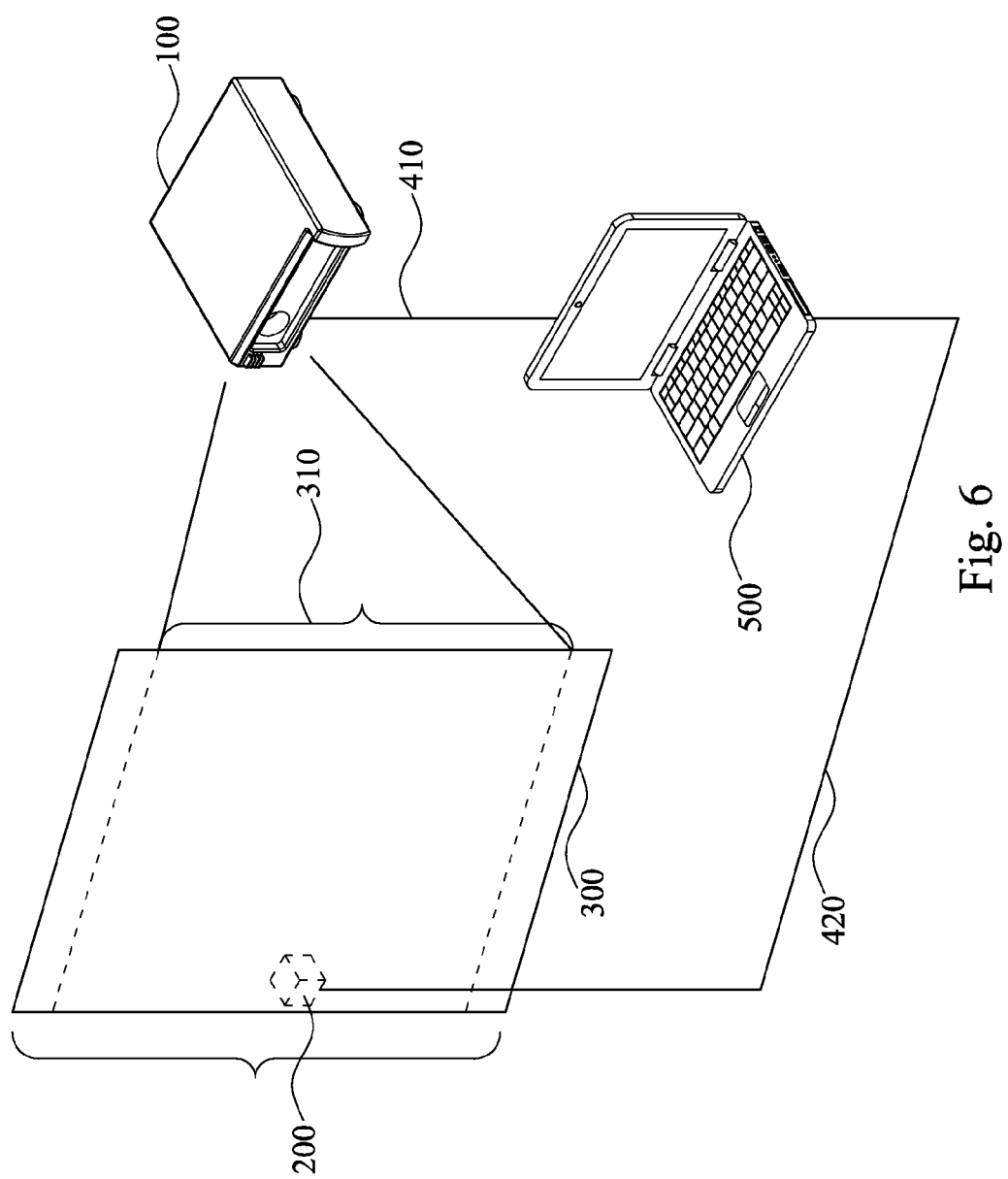
FIG. 6 is a schematic perspective view of the projection system in accordance with another embodiment of the present invention.

FIG. 6 is a schematic perspective view of the projection system in accordance with another embodiment of the present invention. As shown in FIG. 6, the main difference between this embodiment and FIG. 1 is that: the projection system of this embodiment includes a computer 500. The computer 500 is electrically connected between the projector 100 and the brightness detection device 200. In particular, the computer 500 may employ a first connection sub-wire 410 to connect to the projector 100, and may employ a second connection sub-wire 420 to connect to the brightness detection device 200. The first connection sub-wire 410 is compatible with the connection interface of the projector 100, so that the computer 500 can connect to and control the projector 100 via the connection interface 104.

Figure 7:
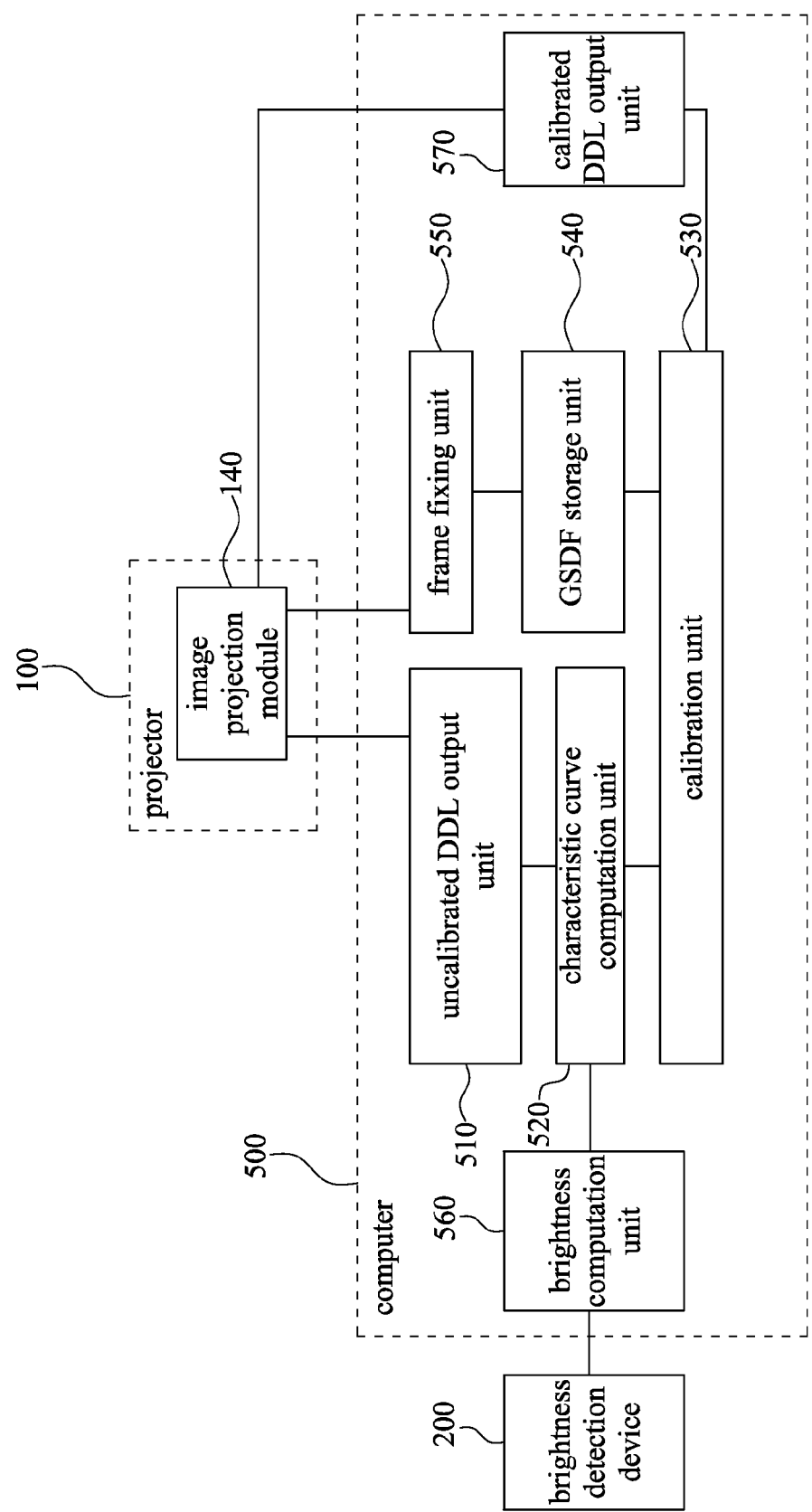
FIG. 7 is a functional block diagram of the projection system in accordance with another embodiment of the present invention.

FIG. 7 is a functional block diagram of the projection system in accordance with another embodiment of the present invention. As shown in FIG. 7, the functions of the computer 500 are similar to which of the controller 110 in FIG. 2. In particular, the computer 500 includes an uncalibrated DDL output unit 510, a characteristic curve computation unit 520, a calibration unit 530, a GSDF storage unit 540, a frame fixing unit 550, a brightness computation unit 560 and a calibrated DDL output unit 570. In other words, the functions executed by the computer 500 are the same as the functions executed by the controller 110 described in the foregoing context, and therefore will not be described repeatedly. The foregoing units can be, but are not limited to be, the program, the software, or the firmware, installed in the computer 500. In this embodiment, because the calibration process can be executed by the computer 500, the burden of the projector 100 can be lowered.

In some embodiments, the computer 500 can be, but is not limited to be, a desk PC, a notebook, a tablet PC, a smart phone, or a PDA.

Figure 8:
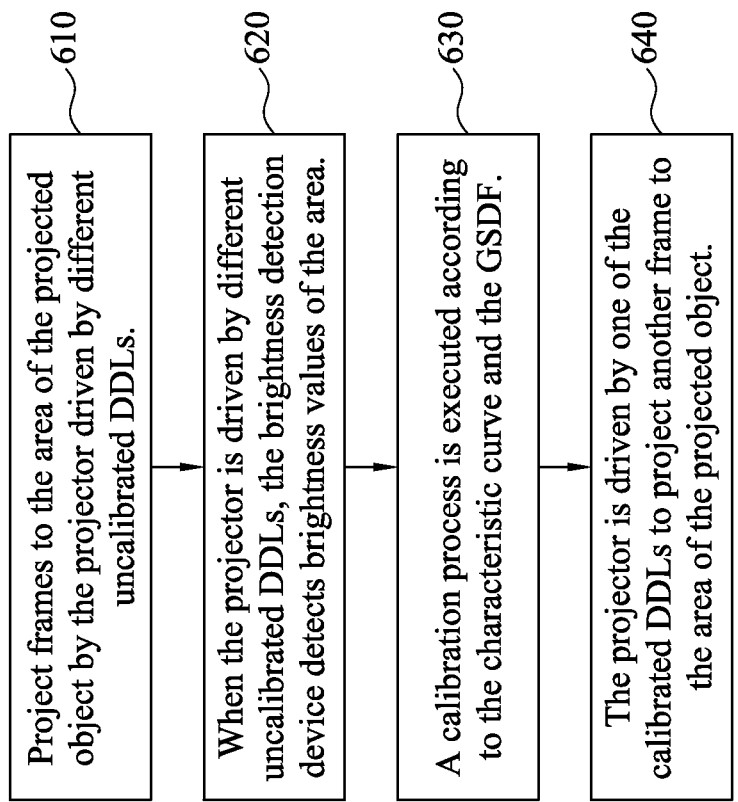
FIG. 8 is a method for calibration the projector in accordance with one embodiment of the present invention.

FIG. 8 is a method for calibration the projector in accordance with one embodiment of the present invention. As shown in FIG. 8, the method includes steps as follow.

In step 610, projecting frames to the area of the projected object by the projector driven at different uncalibrated DDLs. In particular, the projector can project frames with different brightness values to the projected object according to different uncalibrated DDLs.

In step 620, when the projector is driven at the different uncalibrated DDLs, the brightness detection device can be used to detect brightness values of the area, so as to obtain the characteristic curve of the projector. In particular, when the uncalibrated DDL of the projector varies, the brightness detection device can detect the brightness value of the projected object. Then, the characteristic curve can be obtained according to the uncalibrated DDLs and the correspondingly detected brightness values.

In step 630, a calibration process can be executed according to the characteristic curve and the GSDF, so as to map each of the uncalibrated DDLs to a calibrated DDL. Then, the LUT presenting the uncalibrated DDLs versus the calibrated DDLs can be produced.

In step 640, the projector can be driven at one of the calibrated DDL to project another frame to the area of the projected object.

Figure 9:
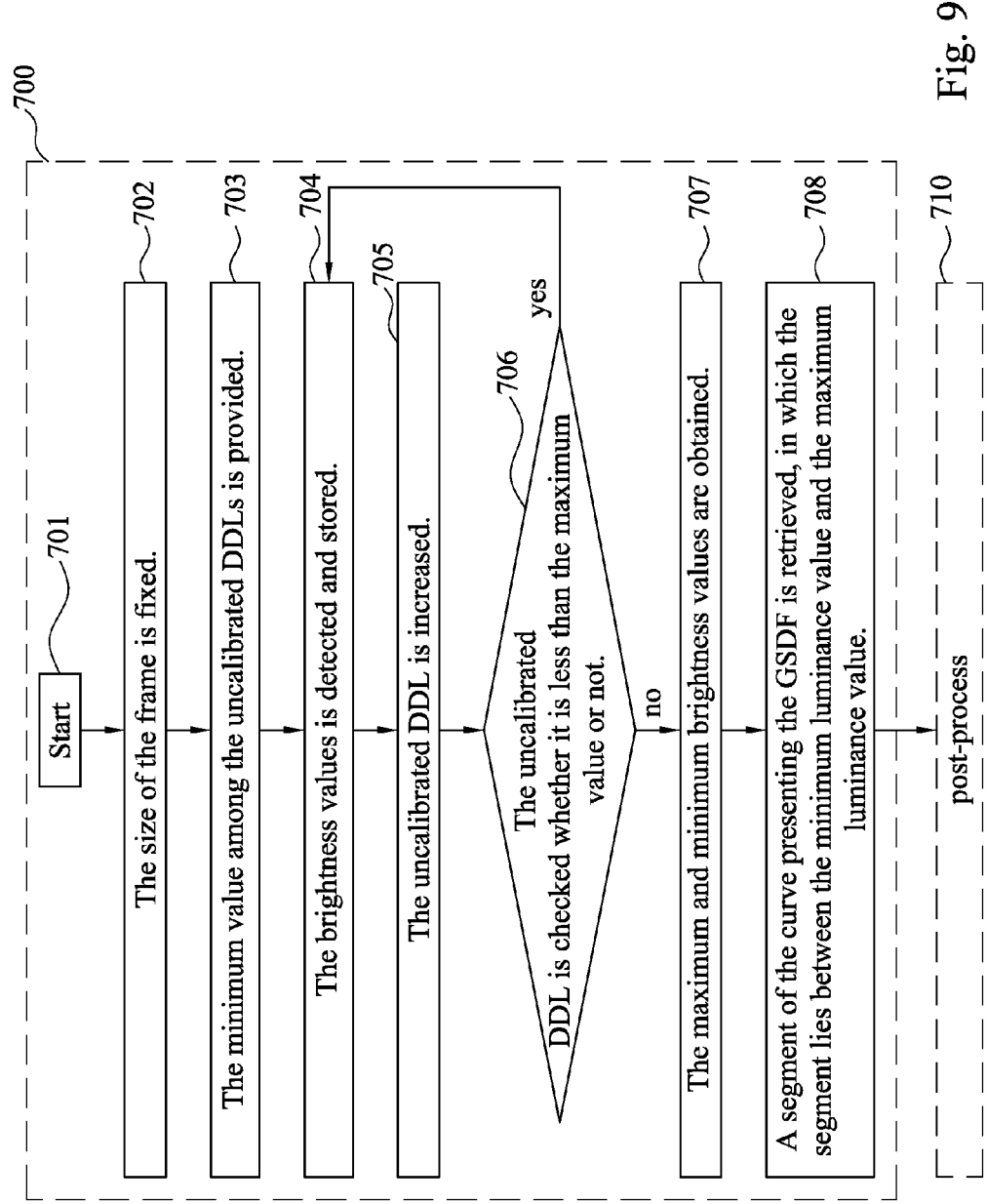
FIG. 9 is a flow chart of a pre-process of the method for calibrating the projector in accordance with one embodiment of the present invention.
Figure 10:
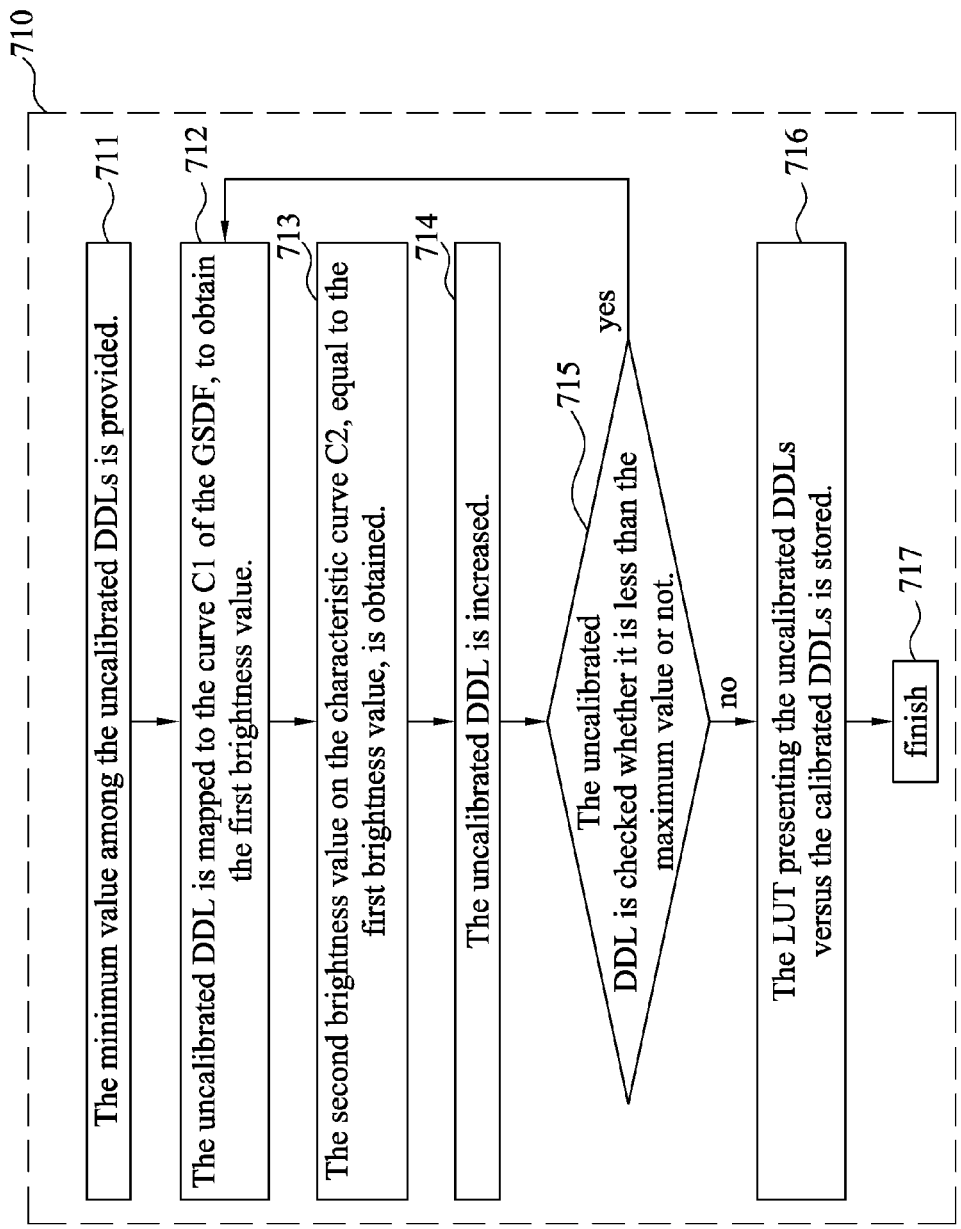
FIG. 10 is a flow chart of a post-process of the method for calibrating the projector in accordance with one embodiment of the present invention.

Specific calibration method refers to FIGS. 9 and 10. FIG. 9 is a flow chart of a pre-process 700 of the method for calibration the projector in accordance with one embodiment of the present invention. FIG. 10 is a flow chart of a post-process 710 of the method for calibration the projector in accordance with one embodiment of the present invention. As shown in FIG. 9, the pre-process 700 includes steps as follow.

In step 701, the pre-process 700 is started.

In step 702, the size of the frame is fixed. In particular, the frame can be adjusted to required size. The frame fixing unit in the projector or the external computer can be employed to control the image projection module to fix the size of the frame.

In step 703, the minimum value among the uncalibrated DDLs can be provided. In particular, the uncalibrated DDL output unit can output the minimum value among the uncalibrated DDLs to the image projection module.

In step 704, the brightness values can be detected and stored. In particular, the brightness detection device can detect the brightness value of the frame on the projected object.

In step 705, the uncalibrated DDL can be increased. In particular, the uncalibrated DDL output unit increases a unit value of the uncalibrated DDL. For example, if the DDL is a 8-bit value, the DDL satisfies: $0 \leq DDL \leq 255$, in which the DDL is an integer. In step 705, a unit value of the uncalibrated DDL can be increased, for example, the DDL can be turned to "1" from "0".

In step 706, the uncalibrated DDL can be checked whether it is less than the maximum value or not. In particular, the uncalibrated DDL output unit can check whether the uncalibrated DDL is less than the maximum value or not. For example, if the DDL is an 8-bit value, the uncalibrated DDL output unit can check the DDL is less than 255 or not. If the DDL is less than the maximum value, such as 255, return to step 704; if the DDL is equal to the maximum value, such as 255, go forward to step 707.

In step 707, the maximum and minimum brightness values can be obtained. In particular, the characteristic curve computation unit can obtain the maximum and minimum brightness values, and can produce the characteristic curve C2 (See FIG. 4) based on the brightness values and the uncalibrated DDLs.

In step 708, a corresponding segment of the curve presenting the GSDF can be retrieved, in which the segment lies between the minimum luminance value and the maximum luminance value. In particular, the calibration unit obtains the curve C1 presenting the GSDF (See FIG. 4) from the GSDF storage unit, and retrieves the segment between the minimum luminance value and the maximum luminance value.

When the pre-process is completed, the characteristic curve C2 and the curve C1 of the GSDF can be obtained. Then, the post-process 710 can be proceeded. As shown as FIG. 10, the post-process 710 includes steps as follows.

In step 711, the minimum value among the uncalibrated DDLs can be provided. In particular, the uncalibrated DDL output unit can output the minimum value among the uncalibrated DDLs to the calibration unit.

In step 712, the uncalibrated DDL in step 711 can be mapped to the curve C1 of the GSDF, to obtain the first brightness value. For example, referring to FIG. 4, the uncalibrated DDL refers to the point "i", and the first brightness value on the curve C1 of the GSDF refers to the point "j".

In step 713, the second brightness value on the characteristic curve C2, equal to the first brightness value, can be obtained. The second brightness value can maps the calibrated DDL according to the characteristic curve C2. For example, referring to FIG. 4, the calibration unit can obtain the point "k" on the characteristic curve C2, in which the point "k" and the point "j" include the equal longitudinal value. The calibration unit can then map the point "k" to the point "l".

In step 714, the uncalibrated DDL can be increased. In particular, the uncalibrated DDL output unit increases a unit value of the uncalibrated DDL. For example, if the DDL is a 8-bit value, the DDL satisfies: 0≤DDL≤255, in which the DDL is an integer. In step 714, a unit value of the uncalibrated DDL can be increased, for example, the DDL can be turned to "1" from "0".

In step 715, the uncalibrated DDL can be checked whether it is less than the maximum value or not. In particular, the uncalibrated DDL output unit can check whether the uncalibrated DDL is less than the maximum value or not. For example, if the DDL is an 8-bit value, the uncalibrated DDL output unit can check the DDL is less than 255 or not. If the DDL is less than the maximum value, such as 255, return to step 712; if the DDL is equal to the maximum value, such as 255, go forward to step 716.

In step 716, the LUT presenting the uncalibrated DDLs versus the calibrated DDLs can be stored. In particular, the calibration unit can store the correlation that each of the uncalibrated DDLs, such as the point "i" in FIG. 4, maps to one corresponding calibrated DDL "l", and the calibration can produce the LUT based on the correlation.

In step 717, finish the calibration method.

When the pre-process 700 and the post-process 710 are completed, the calibrated DDL output unit can output the calibrated DDLs to the image projection module, so that the image projection module can project the frames or images that comply with the GSDF.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection system, comprising:
a projector;
an uncalibrated Digital Driving Level (DDL) output unit for driving the projector at different uncalibrated DDLs to respectively project a frame to an area of a projected object;
a light detection device for detecting brightness values of the area when the projector is driven at the different uncalibrated DDLs;
a characteristic curve computation unit for obtaining a characteristic curve based on the uncalibrated DDLs and the detected brightness values;
a calibration unit for executing a calibration process according to the characteristic curve and Grayscale Standard Display Function (GSDF), so as to map each of the uncalibrated DDLs to a calibrated DDL;
a calibrated DDL output unit for driving the projector at one of the calibrated DDLs to project another frame to the area of the projected object; and
a frame fixing unit configured to control the image projection module to keep a size of the frame projected to the projected object constant based on a determination that the size of the frame varies from a predetermined frame size during a period that the characteristic curve computation unit executes the process of obtaining the characteristic curve and the calibration unit executes the calibration process.

2. The projection system of claim 1, wherein the calibration process executed by the calibration unit comprises:
providing one of the uncalibrated DDLs;
mapping the uncalibrated DDL to the GSDF to obtain a first brightness value;
obtaining a second brightness value on the characteristic curve, wherein the second brightness value is equal to the first brightness value; and
mapping the second brightness value to the calibrated DDL according to the characteristic curve.

3. The projection system of claim 1, further comprising:
a brightness computation unit, wherein the brightness values detected by the light detection device are illuminance values, and the brightness computation unit obtains respective luminance values of the frames according to the respective illuminance values and a gain value of the area.

4. The projection system of claim 1, wherein the uncalibrated DDL output unit, the characteristic curve computation unit and the calibration unit are configured in the projector.

5. The projection system of claim 1, further comprising:
a computer electrically connected to the projector, wherein the uncalibrated DDL output unit, the characteristic curve computation unit and the calibration unit are configured in the computer.

6. A projector, comprising:
an image projection module;
an uncalibrated Digital Driving Level (DDL) output unit for driving the projector at different uncalibrated DDLs to respectively project a frame to an area of a projected object;
a characteristic curve computation unit for obtaining a characteristic curve based on the uncalibrated DDLs and brightness values detected by a brightness detection device;
a calibration unit for executing a calibration process according to the characteristic curve and Grayscale Standard Display Function (GSDF), so as to map each of the uncalibrated DDLs to a calibrated DDL;

a calibrated DDL output unit for driving the image projection module at one of the calibrated DDLs to project another frame to the area of the projected object; and a frame fixing unit configured to control the image projection module to keep a size of the frame projected to the projected object constant based on a determination that the size of the frame varies from a predetermined frame size during a period that the characteristic curve computation unit executes the process of obtaining the characteristic curve and the calibration unit executes the calibration process.

7. The projector of claim 6, wherein the calibration process executed by the calibration unit comprises:

providing one of the uncalibrated DDLs;

mapping the uncalibrated DDL to the GSDF to obtain a first brightness value;

obtaining a second brightness value on the characteristic curve, wherein the second brightness value is equal to the first brightness value; and mapping the second brightness value to the calibrated DDL according to the characteristic curve.

8. The projector of claim 6, further comprising:

a brightness computation unit, wherein the brightness values detected by the light detection device are illuminance values, and the brightness computation unit obtains respective luminance values of the frames according to the respective illuminance values and a gain value of the area.

9. A method for calibrating a projector, comprising steps of:

projecting frames to an area of a projected object by a projector driven at different uncalibrated DDLs;

keeping sizes of the frames projected to the projected object constant based on a determination that the sizes of the frames vary from a predetermined size;

detecting brightness values of the area by a brightness detection device when the projector is driven at the different uncalibrated DDLs and during a period that the sizes of the frames projected to the projected object are kept constant, so as to obtain a characteristic curve of the projector;

executing a calibration process according to the characteristic curve and Grayscale Standard Display Function (GSDF) during the period that the sizes of the frames projected to the projected object are kept constant, so as to map each of the uncalibrated DDLs to a calibrated DDL; and projecting another frame to the area of the projected object by the projector driven at one of the calibrated DDLs.

10. The method for calibrating the projector of claim 9, further comprising the step of:

re-obtaining the characteristic curve and re-executing the calibration process after the size of the frame varies.

11. The method for calibrating the projector of claim 9, wherein the calibration process comprises:

providing one of the uncalibrated DDLs;

mapping the uncalibrated DDL to the GSDF to obtain a first brightness value;

obtaining a second brightness value on the characteristic curve, wherein the second brightness value is equal to the first brightness value; and mapping the second brightness value to the calibrated DDL according to the characteristic curve.

12. The method for calibrating the projector of claim 9, wherein the brightness values are illuminance values, and the method further comprises obtaining respective luminance values of the frames according to the respective illuminance values and a gain value of the area.

\* \* \* \* \*